United States Patent
Park et al.

(10) Patent No.: US 8,228,655 B2
(45) Date of Patent: Jul. 24, 2012

(54) FAULT CURRENT LIMITER

(75) Inventors: Kwon Bae Park, Daejeon (KR); Won Joon Choe, Cheongju-si (KR); Jung Wook Sim, Cheongju-si (KR); Gyeong Ho Lee, Cheongju-si (KR)

(73) Assignee: LS Industrial Systems Co., Ltd., Anyang-Si, Gyeonggi-Do (KR)

( * ) Notice: Subject to any disclaimer, the term of this patent is extended or adjusted under 35 U.S.C. 154(b) by 469 days.

(21) Appl. No.: 12/497,524

(22) Filed: Jul. 2, 2009

(65) Prior Publication Data

US 2010/0165532 A1 Jul. 1, 2010

(30) Foreign Application Priority Data

Dec. 31, 2008 (KR) ................. 10-2008-0138843

(51) Int. Cl.
*H02H 9/02* (2006.01)
(52) U.S. Cl. ...................................... 361/93.9
(58) Field of Classification Search .......... 361/93.9, 361/19; 505/150, 300
See application file for complete search history.

(56) References Cited

U.S. PATENT DOCUMENTS

| | | | | |
|---|---|---|---|---|
| 6,239,957 | B1 * | 5/2001 | McDougall et al. | 361/19 |
| 7,551,410 | B2 * | 6/2009 | Darmann | 361/19 |
| 2008/0043382 | A1 * | 2/2008 | Lee et al. | 361/19 |
| 2009/0052097 | A1 * | 2/2009 | Hyun et al. | 361/19 |
| 2010/0165533 | A1 * | 7/2010 | Lee et al. | 361/93.9 |
| 2011/0177953 | A1 * | 7/2011 | Llambes et al. | 505/150 |
| 2011/0261496 | A1 * | 10/2011 | Bang et al. | 361/93.9 |

FOREIGN PATENT DOCUMENTS

| | | |
|---|---|---|
| KR | 20-0300986 | 1/2003 |
| KR | 10-0718177 | 5/2007 |
| KR | 10-0802312 | 2/2008 |

* cited by examiner

*Primary Examiner* — Rexford Barnie
*Assistant Examiner* — Angela Brooks
(74) *Attorney, Agent, or Firm* — Lee, Hong, Degerman, Kang & Waimey

(57) ABSTRACT

The present disclosure is related to a fault current limiter comprising, a current limiting unit configured to limit a fault current according to a reactance value by increasing the reactance value if the fault current is generated, and a driving unit configured to increases an inductance of the current limiting unit by generating a repulsive force by means of the fault current when the fault current is received and the driving unit is connected to the front end of the current limiting unit.

13 Claims, 9 Drawing Sheets

[FIG. 1]
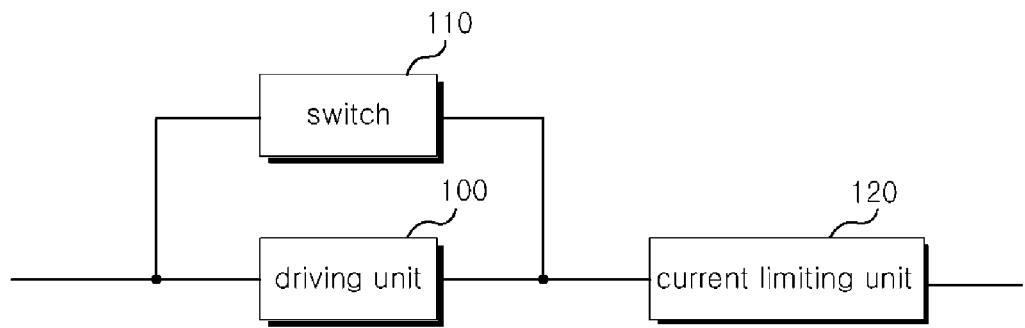
[FIG. 2]
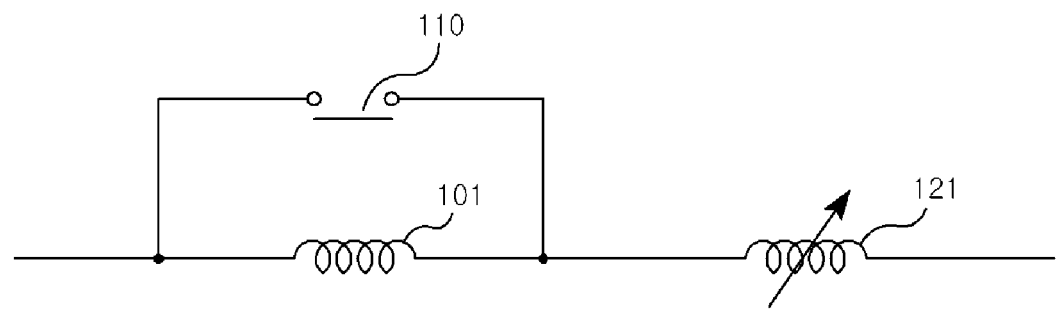

[FIG. 3]
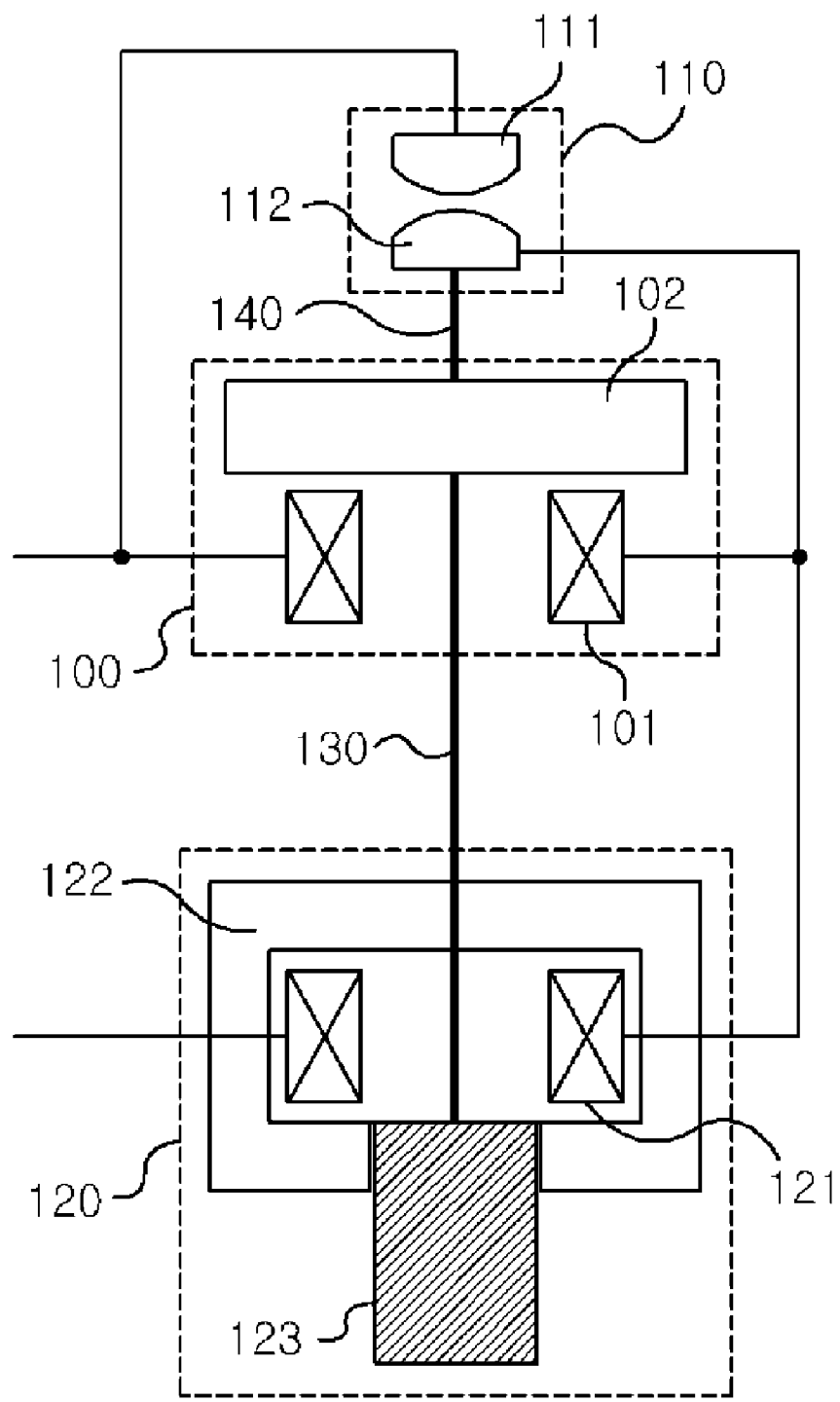

[FIG. 4a]
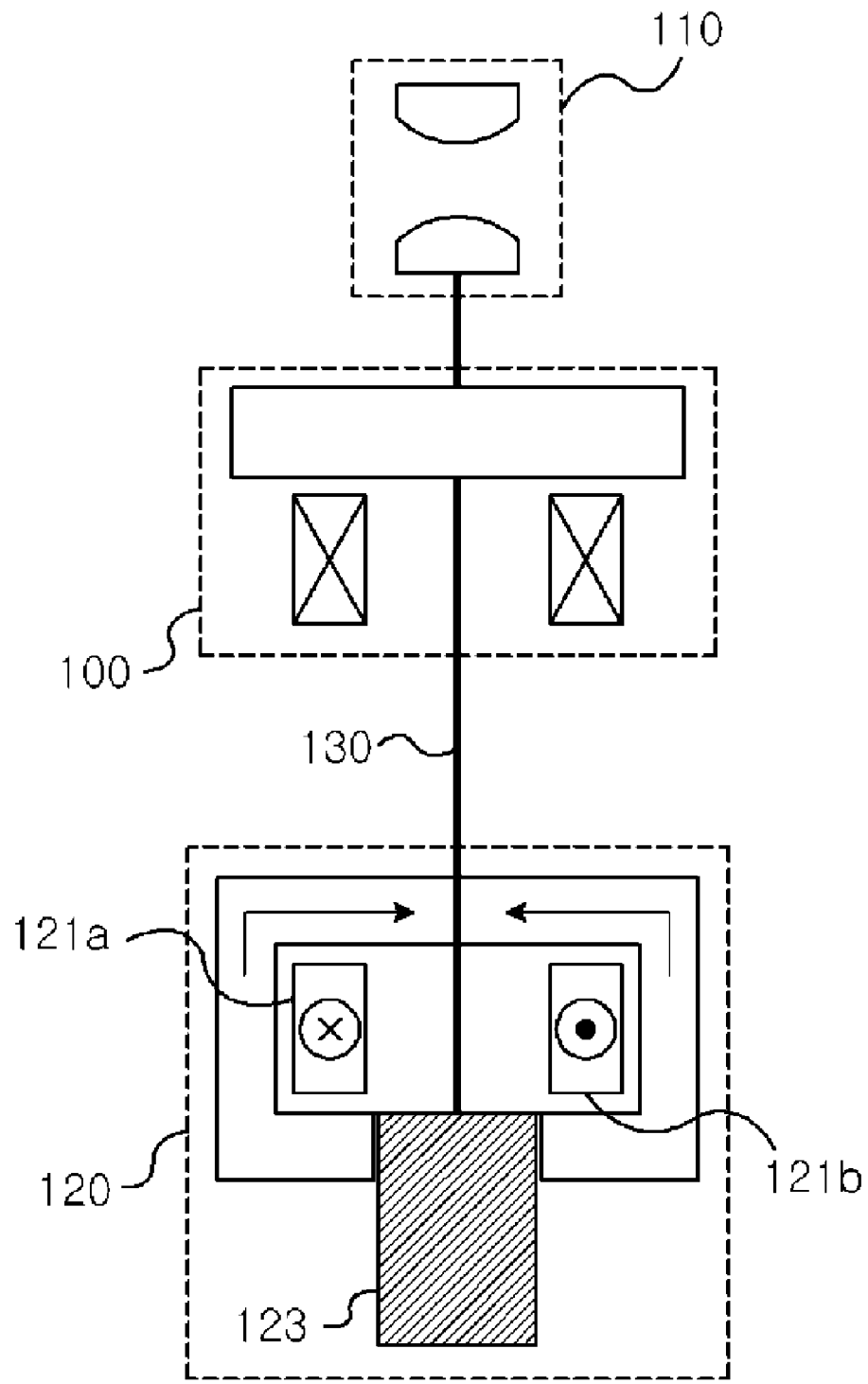

[FIG. 4b]
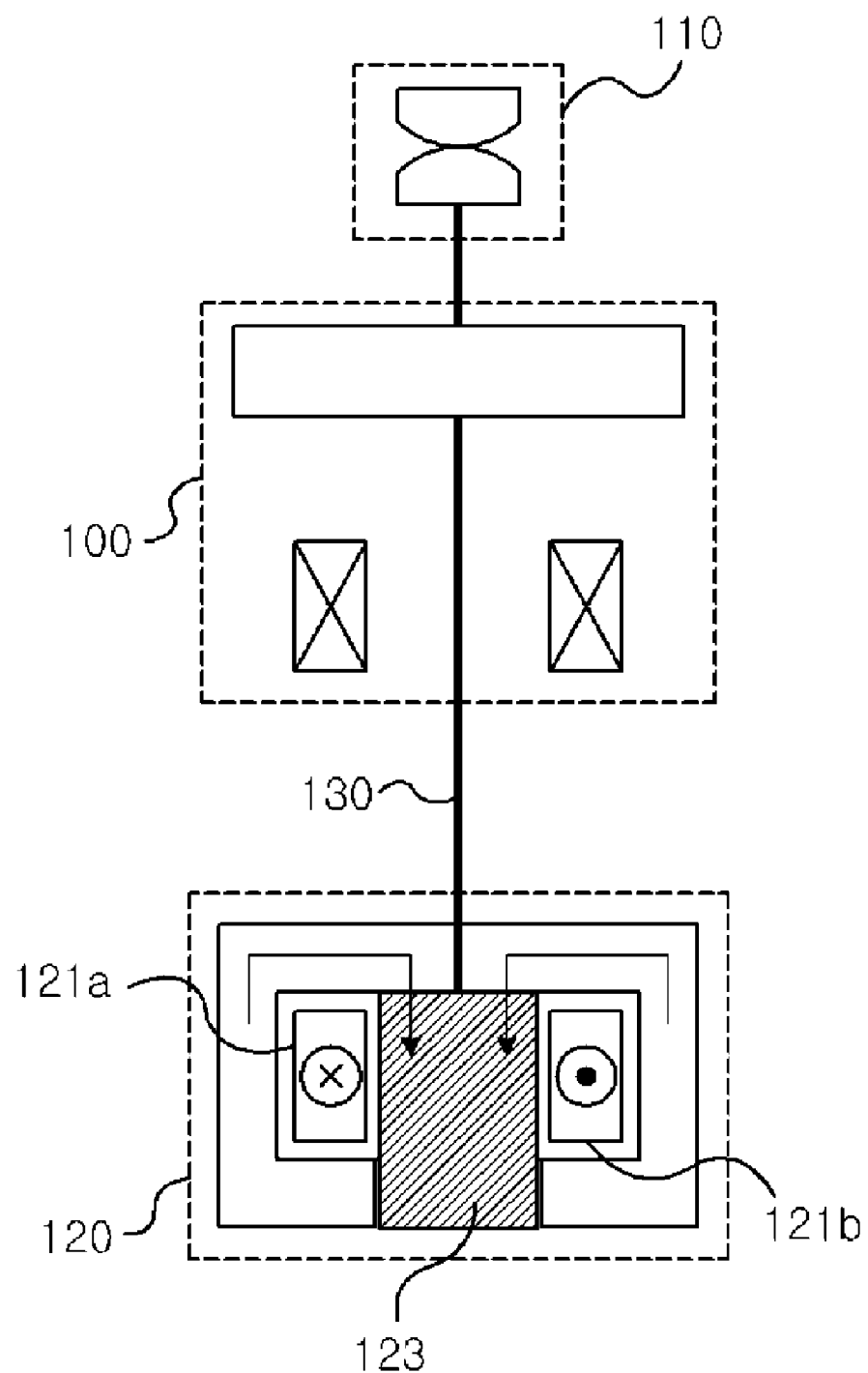

[FIG. 5a]
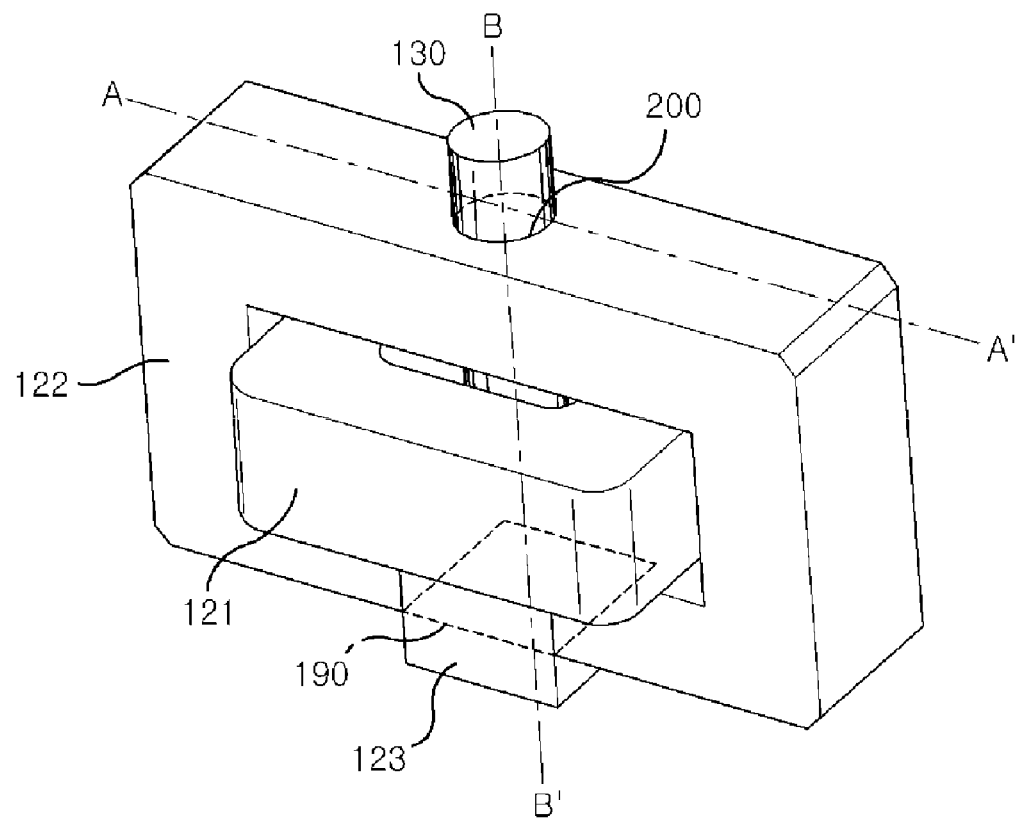

[FIG. 5b]
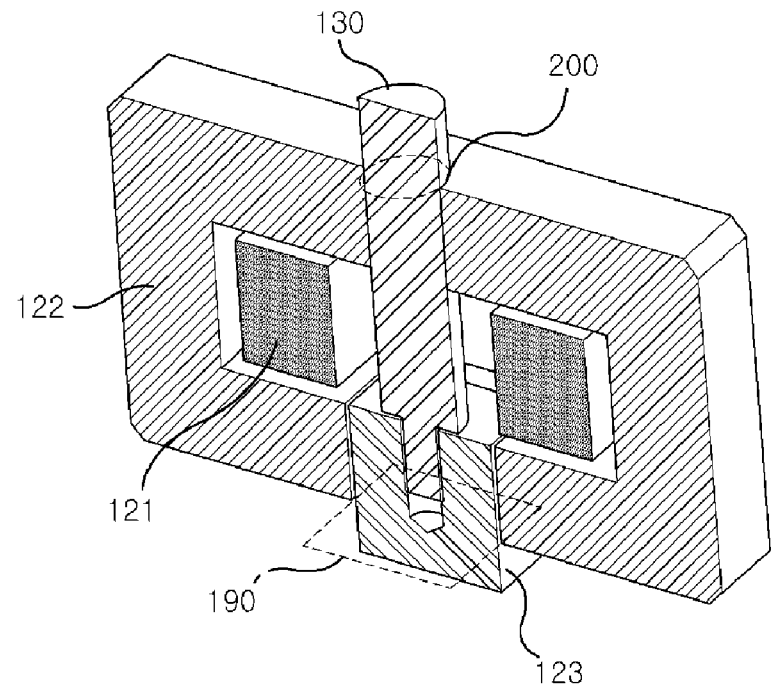
[FIG. 5c]
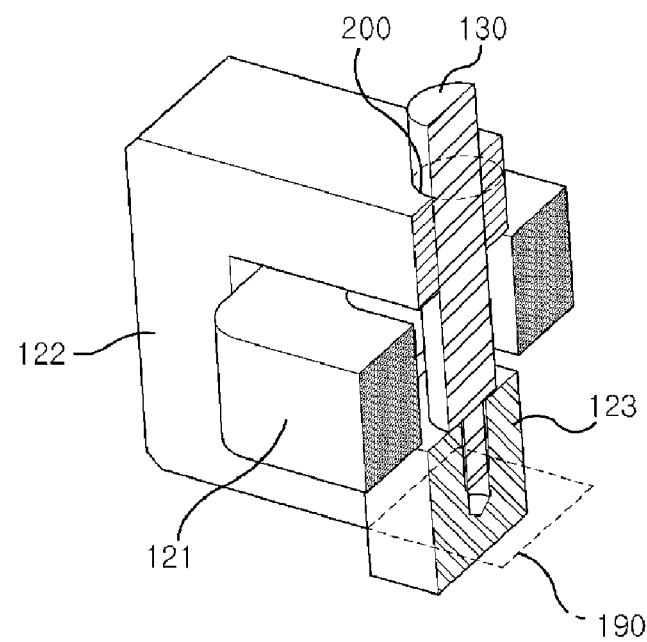

[FIG. 6]
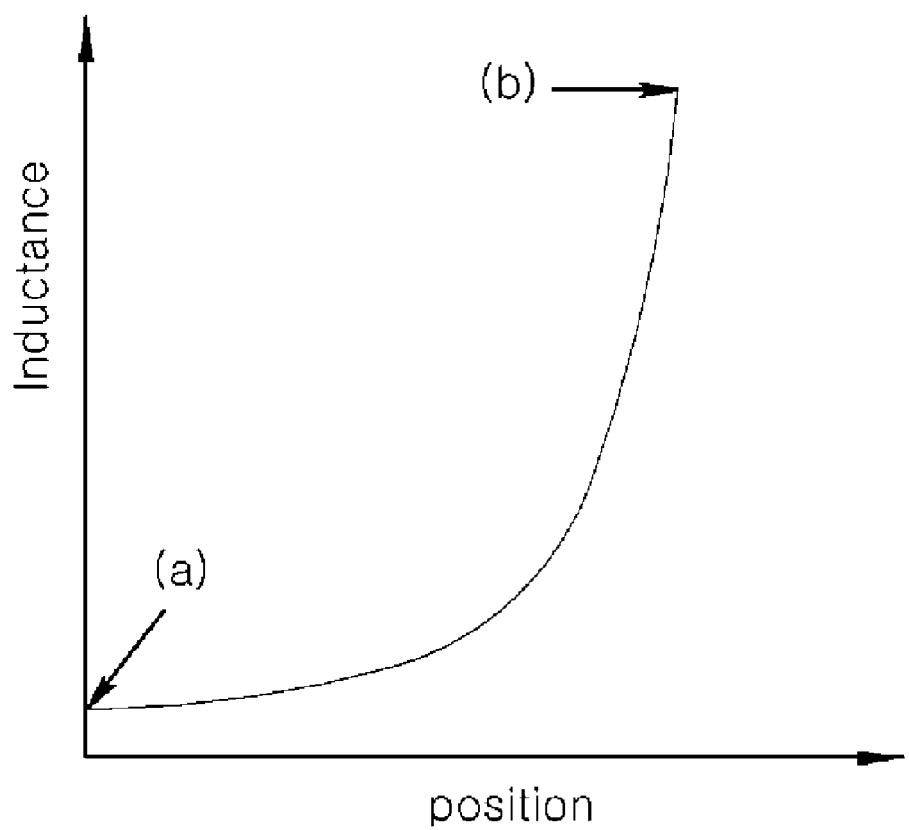

[FIG. 7]
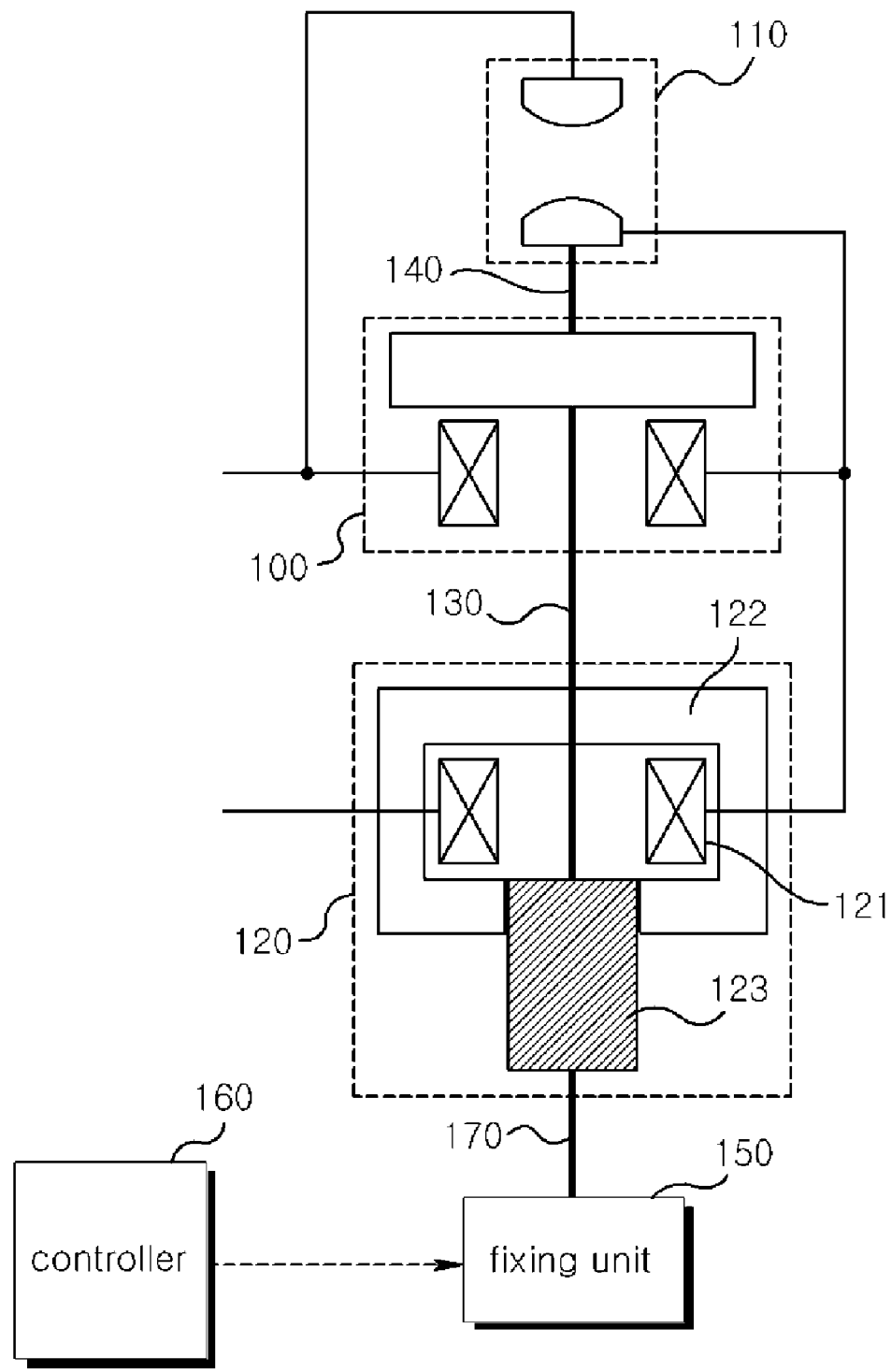

[FIG. 8]
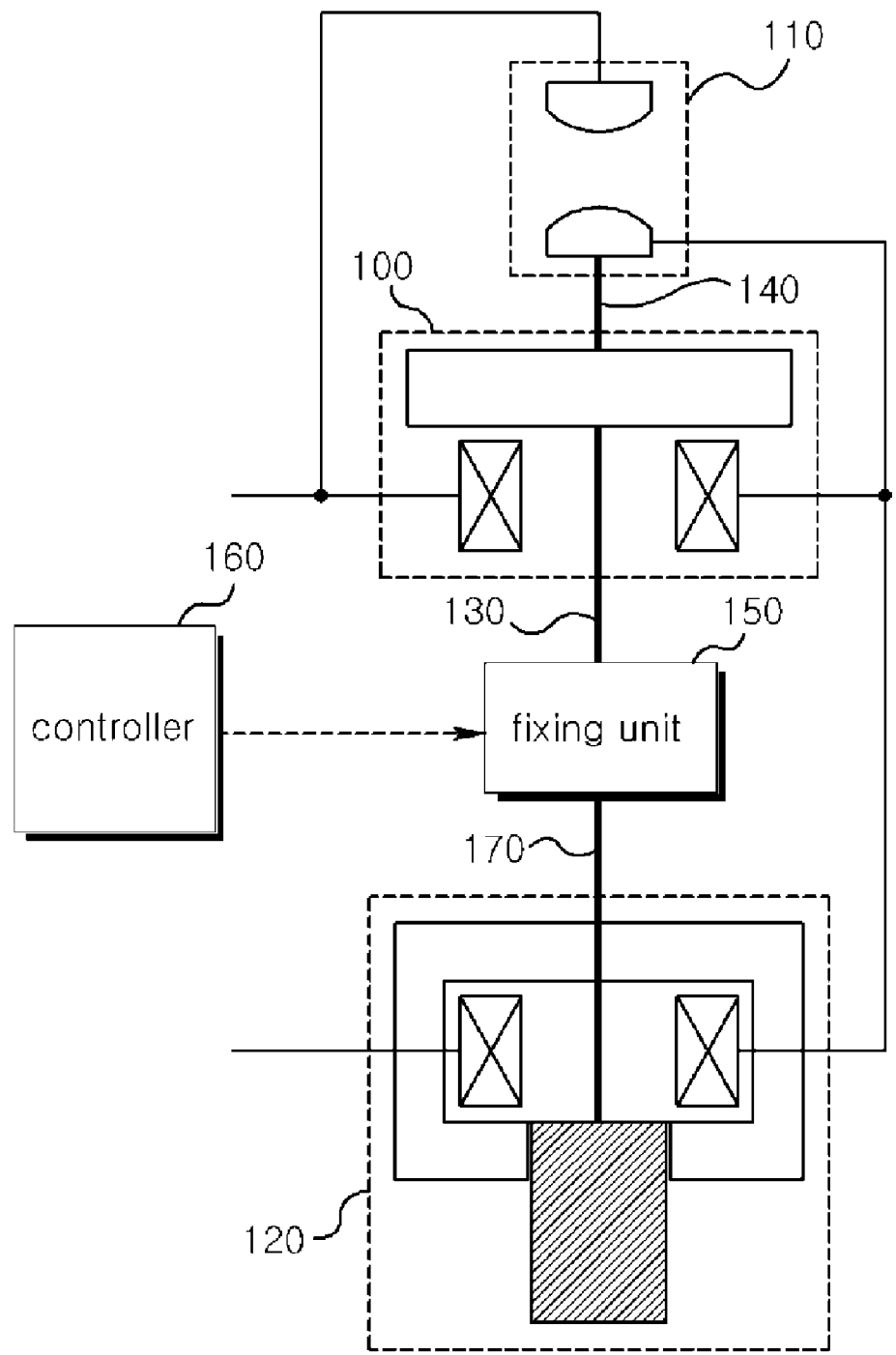

FAULT CURRENT LIMITER

This application claims the benefit of the Korean Patent Application No. 10-2008-0138843, filed on Dec. 31, 2008, which is hereby incorporated by reference as if fully set forth herein.

BACKGROUND OF THE DISCLOSURE

1. Field of the Disclosure

The present disclosure relates to a fault current limiter configured to limit a fault current by increasing a reactance value by means of moving a moving core using a repulsive force.

2. Discussion of the Related Art

An electric power system is generally mounted with a current limiter for limiting a fault current more than a threshold value in order to protect against burnt-out and damage by the fault current caused by accidents such as thunder-stroke, earth fault and short-circuit, and a circuit breaker for preventing the fault current from load.

The current limiter serves to limit a fault current more than a threshold value to reduce mechanical, thermal and electrical stresses caused by electric power appliances such as, for example, bus bars, insulators and circuit breakers, to a minimum and to protect the electric appliances against the fault current.

On the other hand, a circuit breaker connected to an electric power system detects an over-current more than a threshold value, breaks the connection with the electric power system in accordance with control of an over-current relay generating a breaking signal and thus prevents the over-current from flowing into the electric power system.

Meanwhile, 3 to 5 periods of the fault current are required in a circuit breaker for breaking an over-current more than a threshold value in response to control of an over-current relay, which is due to the fact that a considerable time is required for the over-current relay to detect a fault current exceeding a threshold value.

SUMMARY OF THE DISCLOSURE

Accordingly, an object of the present disclosure is to provide a fault current limiter comprising: a current limiting unit configured to limit a fault current according to a reactance value by increasing the reactance value if the fault current is generated; and a driving unit configured to increase an inductance of the current limiting unit by generating a repulsive force by means of the fault current when the fault current is received and the driving unit is connected to the front end of the current limiting unit.

In some exemplary embodiments, the current limiting unit comprises a first coil, a moving core connected to the driving unit, moved from a first position to a second position through the first coil, and configured to increase the reactance value while moving the first position to the second position.

In some exemplary embodiments, the fault current limiter further comprises a fixing core having a first opening on one side, the fixing core wrapping up a first coil, wherein the moving core is moved through the first opening and an internal of the first coil. In some exemplary embodiments, the first position of the moving core is a position prior to entry of the moving core into the internal of the first opening.

In some exemplary embodiments, the second position of the moving core is a position being connected to be interfered at an inner wall of the fixing core.

In some exemplary embodiments, the driving unit comprises a second coil configured to generate a repulsive force when the fault current flows; and a repulsive plate whose position is changed by the repulsive force.

In some exemplary embodiments, the fault current limiter further comprises a first shaft configured to move the position of the moving core, the first shaft connected to the moving core, wherein the position of moving core is changed when the position of the repulsive plate is changed by a repulsive force.

In some exemplary embodiments, the fixing core comprises a second opening configured to pass the first shaft.

In some exemplary embodiments, the moving core, a first opening and a second opening of the fixing core are placed on alignment.

In some exemplary embodiments, the fault current limiter further comprises a switch connected to the repulsive plate, and configured to conduct the fault current when a contact point is contacted by means of changing the position of the repulsive plate by the repulsive force.

In some exemplary embodiments, the connection between the switch and the repulsive plate is one of any connections where the first shaft goes through the repulsive plate, a direct connection and a connection by means of the second shaft.

In some exemplary embodiments, the fault current limiter further comprises a fixing unit configured to maintain an open state or a close state of the switch, where the fixing unit is connected to the first shaft.

In some exemplary embodiments, the fault current limiter further comprised a controller configured to control such that the fixing unit changes the position of the first shaft to close the switch when the fault current is removed.

In some exemplary embodiments, the fault current limiter further comprises a sensor unit configured to detect whether the current is normal current or the fault current, wherein the controller controls such that the fixed unit changes the position of the first shaft to close the switch, when a signal from the sensor unit is received, and the signal is generated when the fault current is removed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 1 is a block diagram of a fault current limiter according to one embodiment of the present disclosure.

FIG. 2 is a diagram for showing a circuit of the fault current limiter in FIG. 1.

FIG. 3 is a diagram for showing the detailed structure of the FIG. 1.

FIG. 4A and FIG. 4B are diagrams showing a driving process of the current limiting unit.

FIG. 5A to FIG. 5C are a perspective view or a sectional view of the current limiting unit.

FIG. 6 is a diagram for displaying the change of inductance value of the current limiting unit in the one embodiment of the present disclosure.

FIG. 7 is a diagram for displaying another embodiment of fault current limiter according to the present disclosure.

FIG. 8 is a diagram for displaying another embodiment of fault current limiter according to the present disclosure.

DETAILED DESCRIPTION OF THE DISCLOSURE

FIG. 1 is a block diagram of a fault current limiter according to one embodiment of the present disclosure.

Referring to the FIG. 1, the fault current limiter according to the present disclosure comprises a driving unit 100, a switch 110 and a current limiting unit 120.

The driving unit 100 flow a normal current without any operation when the normal current flows. On the other hand, in the case that the fault current is generated, the driving unit 100 contacts the contact point of the switch 110 by using the repulsive force generated from the fault current, and increase the reactance value of the current limiting unit 120. The 'normal current' means the current flown in the normal state. The normal state means a state where the thunder-stroke, earth fault and short-circuit are not generated. The fault current means a huge current which is generated by the thunder-stroke, earth fault or short-circuit.

The switch 110 is connected in parallel with the driving unit 100. The switch 110 is contacted to the contact point by driving the driving unit 100 when the fault current is generated. Therefore, the contact point of the switch 110 is contacted, and the fault current flows through the switch 110. As aforementioned, when the huge fault current is generated, the switch 110 may protect the mechanical damage of the driving unit, wherein the damage may occur according to increases the repulsive force generated in the driving unit 100.

The current limiting unit 120 is connected to the rear ends of the driving unit 100 and the switch 110. The current limiting unit has a low reactance value in case the normal current flows. Therefore, the normal current flows smoothly. On the other hand, the current limiting unit has a high reactance value when the fault current flows. The fault current is limited to the pre-determined current value. The current value is changed by the driving unit 100. The driving process will be described with FIG. 3 as following.

FIG. 2 is a diagram for showing a circuit of the fault current limiter in FIG. 1.

Referring to FIG. 1 and FIG. 2, the fault current limiter comprises a switch 110, a first coil 121 and a second coil 101. The driving unit 100 may comprise a second coil. The coil may be an air coil. The air coil may have a very small reactance because the air coil has a limited small number of coil turns and a small radius. The second coil 101 flows a current without any change when the current is the normal current. On the other hand, the second coil contacts the contact point of the switch 110 by using the repulsive force generated from the fault current, and increase the reactance value of the second coil, when a fault current flows. The process of increasing the reactance value in the second coil will be described as under.

The switch maintains a state where the contact point is detached, and then, the contact point is contacted by the repulsive force generated from the fault current which flows in the driving unit 100. When the contact point of the switch 110 is contacted, the fault current flows through the driving unit 100, and then the fault current flows through the switch 110.

The current limiting unit 120 may comprise a first coil 121. The first coil has a low reactance in case the normal current flows, while the first coil has a high reactance when the fault current flows. Therefore, since the first coil has a high reactance in case of generating the fault current, the fault current may be limited to a predetermined current value.

FIG. 3 is diagram for showing the detailed structure of the FIG. 1.

Referring to FIG. 1 and FIG. 3A, the fault current limiter according to one embodiment of the present disclosure may comprise a driving unit 100, a switch 110, a current limiting unit 120, a first shaft 130, and a second shaft 140. The driving unit may include a second coil 101 and a repulsive plate 102. The switch 110 may comprise a first contact point 111 and a second contact point 112. The current limiting unit 120 may include a first coil 121, a fixing core 122, and moving core 123.

The second coil 101 of the driving unit 100 comes near to the lower face of the repulsive plate 102 when the normal current flows. When the fault current flows, the repulsive plate is moved upward by the repulsive force generated from the fault current which flows the second coil 101. Namely, a gap between the repulsive plate 102 and the second coil 101 increases. The repulsive plate is made of a metal having a low resistance such as copper or aluminum.

The one end of the first shaft 130 is connected with the lower portion of the repulsive plate 102, and the other end of the first shaft 130 is connected with moving core. The connecting position where the first shaft 130 is connected with the repulsive plate 102 or the moving core 123 is preferably centered on the repulsive plate 102 or the moving core 123. However it is not limited on this embodiment, the connection position may be changed variously.

The one end of the second shaft 140 is connected with the second contact point 112, and the other end of the second shaft 140 is connected with upper face of the repulsive plate 102. The connecting position where the second shaft 140 is connected with the repulsive plate 102 or the second contact point 112 is preferably centered on the repulsive plate 102 or the second contact point 112. However, it is not limited on that embodiment, the connection position may be changed variously.

The first shaft 130 and the second shaft 120 may be formed in one shaft to connect the switch 110, the repulsive plate 102, and the moving core 123. Moreover, the second contact point 112 and repulsive plate 102 may be directly connected without being connected to the second shaft 140. Namely, whichever element is used, the connection between each element does not matter as long as it maintains the original function.

The switch 110 may include the first contact point 111 and the second contact point 112. The switch 110 is connected in parallel to the driving unit 100. The first contact point and the second contact point are detached for each other when the normal current flows. On the other hand, the second coil 101 is moved upward by the repulsive force generated from the second coil 101 when the fault current flows. Therefore, the second contact point 112 connected to the second shaft 140 is also moved upward. So, the first contact point 111 and the second contact point 112 of the switch 110 are contacted. If the first contact point 111 and the second contact point 112 are contacted, the fault current does not flow to the driving unit 100 anymore, but flows through the switch 110.

Accordingly, the switch 110 may protect the driving unit 100 against the mechanical damage of the driving unit 100 in case a huge fault current is generated where the damage may occur from increasing the repulsive force generated from the driving unit 100.

The first coil 121 of the current limiting unit 120 is connected serially with rear ends of the driving unit 100 and the switch 110. The normal current or the fault current flows in the first coil 121.

The fixing core 122 wraps up the first coil 121. Its lower portion has a first opening, and its upper portion has a second opening. The positions of the first and second opening are not limited to the lower portion and the upper portion of the fixing core 122. The various modifications of the locations will be available. The first opening is large enough to allow the moving core to pass there through, and the second opening is also large enough to allow the first shaft 130 can pass through. Preferably, the diameter of the moving core 123 is almost the same as the size of the first opening, and the diameter of the first shaft 130 is almost the same as the size of the second opening.

The moving core 123 is connected with the repulsive plate 102, is moved through the first coil across the first position and the second position, and increases the reactance value of the current limiting unit 120 as the moving core is moved with direction from the first position to the second position. For example, the driving core 123 is placed outside of the first opening, and then, the driving core 123 is moved through inside of the first opening. The moving core 123 is contacted to be interfered at the inner wall of the fixing core 122 through the internal of the first coil 121. The first position of the moving core is a position prior to entry of the moving core 123 into the internal of the first opening. The second position of the moving core is a position where the moving core is contacted to be interfered at the inner wall of the fixing core 122.

When the normal current flows, two contact points 111, 112 are detached, and the normal current flows through the second coil 101 of the driving unit 100. At this point, the second coil 101 and the repulsive plate 102 almost face each other. The normal current passing the second coil flows to the current limiting unit 120, and the upper portion of the moving core 123, as shown in the FIG. 3, is located inside or outside of the opening formed at the lower face of the fixing core 122. The flux flowing in the fixing core 122 is so limited that the inductance becomes small. Therefore, the normal current flows smoothly.

On the other hand, when the fault current flows, the fault current flows through the second coil 101, and the repulsive force is generated by the fault current. Namely, a gap between the repulsive plate 102 and the second coil increase. The position of the second contact point and the position of the moving core 123 are moved upward as the position of the repulsive plate 102 is moved upward. Accordingly, the first contact point and the second contact point of the switch 110 are contacted, and the position of the moving core 123 also is contacted to the upper portion of the fixing core 122. At this point, the lower portion of the moving core is located within the hole formed on the lower face of the fixing core 122. The fault current flows to the first coil 121 through the switch 110. Moreover, the value of the flux is not offset or leaked out to the air gap, but the flux is formed through the moving core 123. Therefore, as the value of the flux (Ø) increases, so the value of the inductance increases. As a result of that, the value of the reactance in the current limiting unit 120 increases. Therefore, the fault current is limited to a predetermined value as the value of the reactance increases. The process that the reactance comes to be reduced and increased will be described with following FIGS. 4A and 4B.

Accordingly, the current limiter according to the present disclosure needs no separate power source and may limit the fault current by organically connecting the fault current-detecting mean (the driving unit to fault current-limiting mean (current limiting unit).

According to the embodiment of the present disclosure, the fault current limiter may be re-closed after the fault current is removed.

FIGS. 4A and 4B are a diagram showing a driving process of the current limiting unit.

FIG. 4A illustrates a driving process of the current limiting unit when the normal current flows.

Referring to FIG. 4A, the fault current limiter according to the present disclosure includes a driving unit 100, a switch 110, a current limiting unit 120, a first shaft 130, and a second shaft 140. If the normal current flows, the switch 110 is detached and the second coil 101 comes near to with the repulsive plate 102. The normal current flows through the second coil 101 of the driving unit 100, and the normal current passing through the second coil 101 flows the first coil 121 of the current limiting unit 120. At this point, the upper portion of the moving core in the current limiting unit 120 is placed within a hole formed on the lower face of the moving core 122. The left defines an access direction (121a) of the current flowing through the coil and the right indicates an exit direction (121b) of the current. It is only example. The opposite way is also possible. Therefore, the direction of the flux flowing in the fixing core 122 is a direction of the arrow, and the flux comes to be offset or leaked out through the air. The inductance is decreased as the flux is decreased. As a result, the value of the reactance is decreased well, which is evidenced by the following equations.

$$L=Ø/i, X=w*L\ (w=2\Pi f), Z=j*X$$

As described in the foregoing, since the value of the reactance in the current limiting unit 120 is small, the normal current flows smoothly, when the normal current flows.

FIG. 4B illustrates the driving process of the current limiting unit when the fault current flows.

Referring to FIG. 4B, the fault current limiter according to the present disclosure includes a driving unit 100, a switch 110, a current limiting unit 120, a first shaft 130, and a second shaft 140. If the fault current flows, the repulsive force is generated in the second coil 101 by the fault current. By means of the repulsive force, the repulsive plate 102 is moved upward. Namely, a gap between the repulsive plate 102 and the second coil 101 is widened. As the position of the repulsive plate 102 is moved upward, the contact point of the switch and the position of the moving core 123 are moved upward. Therefore, the contact point of the switch 110 is contacted, and the position of the moving core 123 is faced by the upper portion of the fixing core 122. At this point, the lower portion of the moving core is placed within the hole formed on the lower face of the fixing core 122. When the contact point of the switch 110 is contacted, the fault current flows to the first coil 121 through the switch 110. The flux is formed through the moving core 123 according to the change of the position of moving core 123. Therefore, the inductance increases as the flux increases. As a result, the value of the reactance increases. The fault current is limited to a predetermined current value by increased the reactance value.

As described in the foregoing, the fault current limiter according to the present disclosure may limit the level of the fault current by increased the reactance value of the current limiting unit when the fault current is generated. The fault current limiter may limit the fault current effectively. As a result of that, the thermal and mechanical damages of the electric power device (for example, transformer, circuit breaker, fuse, and cable) may be minimized by limiting the fault current. Also, the life or the replacement period of the electric power device can be extended.

Moreover, the fault current limiter according to the present disclosure may limit the current without separate reactance adjusting circuit because the reactance of the current limiting unit is changed by driving the driving unit.

FIG. 5A to FIG. 5C are perspective views or sectional views of the current limiting unit.

FIG. 3 and FIG. 5A are perspective views of the current limiting unit. The current limiting unit 120 includes a first coil 121, a fixing core 122, moving core 123 and a first shaft 130.

When the current is applied to the first coil 121, magnetic force in the first coil 121 is generated. The current may be a normal current or a fault current.

The fixing core 122 wraps up the first coil, and a first opening which can move through the moving core 123 is formed on one side of the fixing core 122. Moreover, a second opening which can move through the first shaft 130 is formed on one side of the fixing core 122.

Moreover, the fixing core 122, as shown in FIG. 5A, vertically wraps up the first coil. As the fixing core 122 is formed vertically, the flux generated in the first coil 121 may flow the fixing core 122 most effectively. The fixing core 122 may have a shape of C. The shape of the fixing core 122 is not necessary to be formed on the first coil 121, vertically. Any shape is allowed if the shape permits the flux to flow. It is preferable that the center of the first opening and the center of the second opening are placed on alignment. However, various modifications are possible. For example, if the center of the first opening and the center of the second opening are placed on alignment, the shape of the first opening and the second opening may be bended, not straight. Besides, the position of the openings 190, 200 will be modified while with maintaining the original function by modifying the other elements according to the changed position of opening.

The moving core 123 changes the value of reactance as the moving core 123 travels inside of the first opening 190 of the fixing core 122 and inside of the first coil 121. Namely, the value of the reactance is changed as the position of the moving core 123 is changed. In the case that the moving core 123 is placed on the first position, the reactance is low. On the other hand, in the case that the moving core 123 is placed on the second position, the reactance is high. The first position may be a position matching with the first opening 190 formed on the fixing core 122. In the case that the moving core placed within the first opening 190 is not completely inserted in internal of the first coil 121, the value of reactance decreases because the flux generated by the first coil 121 is offset or leaked out to the air gap. It is preferable that the position of the moving core 123 would be matched to that of the first opening 190 formed on the fixing core 122. For example, the upper portion of the moving core 123 may be placed within the first opening, or the part of the upper portion of the moving core 123 may be placed within the first coil. Namely, the flux may flow in the position of the moving core 123, and the moving core may be placed on a position to have a low reactance value. Moreover, the moving core 123 may not be placed in the first opening. But that the moving core 123 may be placed outside of the first opening. Consequently, since the flux generated from the first coil 121 is leaked out through the air gap, the reactance decreases. Therefore, the moving core 123 is placed on the first position when the normal current flows.

On the other hand, the second position of the moving core is a position where the moving core is inserted in the first coil. When the upper portion of the moving core is completely inserted in the first coil 121 and the lower portion of the moving core 123 is placed in the first opening 190, the flux generated from the first coil forms a magnetic circuit through the moving core 123 and the reactance increases as the air gap is removed. Therefore, the moving core 123 is placed on the second position when the fault current flows.

For example, the reactance value is small when the moving core is placed in the first opening 190. The reactance value increases as the moving core travels to the internal of the first coil 121. When the moving core is completely inserted in the first coil, the reactance value comes to have a maximum value.

One end of the first shaft 130 is connected to the moving core 123, and the other end of the first shaft is passed through the internal of the second opening. As the first shaft 130 is moved upward, the moving core is moved upward. Referring to FIG. 3, the other end of the first shaft may be connected with repulsive plate 102 of the driving unit 100. As the repulsive plate is moved upward by the repulsive force generated from the second coil, the moving core connected to the first shaft 130 is also moved upward. Therefore, when the fault current is generated, the repulsive plate 102 and the moving core 123 are moved upward. The current limiting unit 120 may limit the fault current to a predetermined current value because the value of the reactance in the current limiting unit increases. The push-fit, the bonding, welding or screwing may be used in connecting the first shaft 130 to the moving core 123.

FIG. 6 is a diagram for displaying the change of inductance value of the current limiting unit in the one embodiment of the present disclosure.

Referring to FIG. 6, the inductance value of the current limiting unit in FIG. 4A is very low (a). On the other hand, the inductance value of the current limiting unit in FIG. 4B is very high (b). Namely, the inductance value increases as the moving core travels from FIG. 4A to FIG. 4B. The flowing current is limited to a value less than a predetermined value if the inductance of the current limiting unit increases. Namely, when the fault current is generated, the fault current may be limited by increased the value of the inductance in the current limiting unit.

FIG. 7 is a diagram for displaying another embodiment of fault current limiter according to the present disclosure.

Referring to FIG. 7, the fault current limiter may include a driving unit 100, a switch 110, a current limiting unit 120, a first shaft 130, a second shaft 140, a fixing unit 150, controller 160 and a third shaft 170.

Other elements except the fixing unit 150, the controller 160 and the third shaft 170 will not be described because they are already described in FIG. 3. We will focus on the fixing unit 150, the controller 160 and the third shaft 170.

The fixing unit functions to open, the close, and the re-close by means of the magnetic force. The fixing unit may provide a driving force for fixing the open state and the close state. The fixing unit may be used in various devices, but the magnetic actuator will be one example of the fixing unit in this embodiment. The description of the magnetic actuator will be omitted for clarity. The magnetic actuator may include a coil opened for executing the open operation of the switch 110, a coil closed for executing the close operation of the switch 110, a plunger movable up and down, and a magnet for generating the driving control force. The magnetic actuator 150 may be a permanent magnetic actuator (PMA) or an electro-magnetic force driving actuator (EMFA).

One end of the third shaft 170 is connected to the lower portion of the moving core 123, and the other end of the third shaft is connected to the plunger of the magnetic actuator 150. The connecting position that the third shaft 170 is connected with the moving core 123 or the magnetic actuator 150, is preferably centered on the moving core 123 or the magnetic actuator 150. However it is not limited on this embodiment, the connection position may be changed variously.

The fault current limiter according to the present disclosure may further include a sensor unit (not shown in Figure) configured to detect whether the current is a normal current or a fault current. The sensor unit transmits a signal to the controller 160 when the sensor unit detects that the fault current is removed. The signal means that the fault current is removed. When the signal is transmitted to the controller, the controller controls so that the close operation of the magnetic actuator can be executed (re-close). The close operation of the switch 110 means that the third shaft is moved downward. It is natural that the magnetic actuator may be replaced by a device capable of mechanically moving the third shaft 170 downward. As the third shaft 170 is moved downward, the switch is detached and the driving unit 100 comes back to the original state where the repulsive plate and the second coil 101 is almost faced. The magnetic actuator 150 executes the close operation by flowed the current into the close coil. Therefore, the normal current flows through the current limiting unit 120 and the driving unit 100. As described in foregoing, after the fault current is removed, the controller controls to flow a normal current quickly by re-closing the magnetic actuator.

As shown in the foregoing, the fault current limiter according to the present disclosure may quickly return to the normal state by quickly re-closing the magnetic actuator after the fault current is removed.

FIG. 8 is a diagram for displaying another embodiment of fault current limiter according to the present disclosure.

Referring to the FIG. 8, the fault current limiter may include a driving unit 100, a switch 110, a current limiting unit 120, a first shaft 130, a second shaft 140, a fixing unit 150, controller 160 and a third shaft 170.

The fault current limiter according to the present disclosure has the same structure and function as those of the fault current limiter in FIG. 6.

The magnetic actuator 150 is placed under the current limiting unit, or between the driving unit 100 and the current limiting unit. Moreover, the magnetic actuator 150 may be placed between the switch 110 and the driving unit 100.

Although it is not shown in figure, the switch may be placed between the driving unit 100 and the current limiting unit 120. In this case, it is preferable that the shaft be placed at left or right side of the lower contact point formed on the switch.

It is to be understood that both the foregoing detailed description of the present invention are exemplary and explanatory and are intended to provide further explanation of the invention as claimed.

What is claimed is:

1. A fault current limiter comprising:
a current limiting unit configured to limit a fault current by increasing a reactance value if the fault current is generated; and
a driving unit configured to increase an inductance of the current limiting unit by generating a repulsive force by means of the fault current when the fault current is received and the driving unit is connected to a front end of the current limiting unit,
the current limiting unit comprising:
a first coil; and
a moving core connected to the driving unit and configured to move from a first position to a second position through the first coil and to increase the reactance value while moving from the first position to the second position.

2. The fault current limiter of claim 1, further comprising a fixing core having a first opening on one side, the fixing core wrapping up the first coil, wherein the moving core is moved through the first opening and an interior of the first coil.

3. The fault current limiter of claim 2,
wherein the first position of the moving core is a position prior to entry of the moving core into the first opening.

4. The fault current limiter of claim 2,
wherein the second position of the moving core is a position in which the moving core is in contact with an inner wall of the fixing core.

5. The fault current limiter of claim 2,
wherein the driving unit comprises:
a second coil configured to generate the repulsive force when the fault current flows; and
a repulsive plate whose position is changed by the repulsive force.

6. The fault current limiter of claim 5, further comprising a first shaft configured to move the moving core, the first shaft connected to the moving core, wherein the position of moving core is changed when the position of the repulsive plate is changed by the repulsive force.

7. The fault current limiter of claim 6,
wherein the fixing core further has a second opening configured to pass the first shaft therethrough.

8. The fault current limiter of claim 7,
wherein the moving core, the first opening, and the second opening of the fixing core are aligned.

9. The fault current limiter of claim 7, further comprising a switch connected to the repulsive plate, and configured to conduct the fault current when a contact point is contacted when the position of the repulsive plate is changed.

10. The fault current limiter of claim 9,
wherein the connection between the switch and the repulsive plate is a connection where the first shaft passes through the repulsive plate and is connected with the repulsive plate, a direct connection or a connection via the second shaft.

11. The fault current limiter of claim 9, further comprising a fixing unit configured to fix an open or a closed state of the switch, wherein the fixing unit is connected to the first shaft.

12. The fault current limiter of claim 11, further comprising a controller configured to control the fixing unit to change the position of the first shaft to close the switch when the fault current is removed.

13. The fault current limiter of claim 12, further comprising a sensor unit configured to detect whether a current is normal current or the fault current, wherein the controller is further configured to control the fixing unit to change the position of the first shaft to close the switch, in response to a signal from the sensor unit is generated when the fault current is removed.

* * * * *